(12) United States Patent
Kuramochi et al.

(10) Patent No.: US 6,375,543 B1
(45) Date of Patent: Apr. 23, 2002

(54) ABRASIVE MOLDING, ABRASIVE DISC AND POLISHING PROCESS USING THE ABRASIVE DISC

(75) Inventors: Hideto Kuramochi, Yokohama; Yoshitaka Kubota, Sagamihara, both of (JP)

(73) Assignee: Tosoh Corporation, Yamagughi (JP)

( * ) Notice: Subject to any disclaimer, the term of this patent is extended or adjusted under 35 U.S.C. 154(b) by 0 days.

(21) Appl. No.: 09/474,007

(22) Filed: Dec. 28, 1999

(30) Foreign Application Priority Data

Dec. 28, 1998 (JP) .............................. 10-373172

(51) Int. Cl.[7] .................................. B24B 1/00
(52) U.S. Cl. .................... 451/28; 451/533; 451/534; 51/294; 51/295
(58) Field of Search .................... 51/294, 295, 298, 51/301; 451/28, 533, 534

(56) References Cited

U.S. PATENT DOCUMENTS

| | | | |
|---|---|---|---|
| 5,893,935 A | * | 4/1999 | Wood |
| 5,908,478 A | * | 6/1999 | Wood |
| 6,039,775 A | * | 3/2000 | Ho et al. |

FOREIGN PATENT DOCUMENTS

| | | | |
|---|---|---|---|
| JP | A H6-39732 | 2/1985 |
| JP | A H5-154760 | 12/1991 |
| JP | A H7-326597 | 6/1994 |
| JP | A H9-22888 | 7/1995 |
| JP | A H10-1376 | 8/1996 |
| JP | A H10-72578 | 6/1997 |

* cited by examiner

Primary Examiner—Joseph J. Hail, III
Assistant Examiner—Willie Berry, Jr.
(74) Attorney, Agent, or Firm—Sughrue Mion, PLLC

(57) ABSTRACT

An abrasive molding predominantly comprised of manganese oxide is described, which has a bulk density of 0.4 to 4.0 g/cm$^3$, a BET specific surface area of 0.2 to 250 m$^2$/g and an average particle diameter of 0.005 to 10 μm. The abrasive molding has a multiplicity of minute pores, preferably with a pore diameter distribution such that the integrated pore volume of minute pores having a pore diameter of at least 1 μm is at least 20%, the integrated pore volume of minute pores having a pore diameter of 10 to 100 μm is at least 15%, and the integrated pore volume of minute pores having a pore diameter exceeding 100 μm is not larger than 5%, based on the total integrated pore volume of the minute pores of the abrasive molding. The porosity is preferably in the range of 30 to 95% by volume based on the apparent volume of the abrasive molding. The minute pores are preferably interconnecting minute pores which are open to the exterior, wherein a solid is contained which is soluble in a polishing liquid. An abrasive disc having the abrasive molding fixed to a supporting auxiliary is used for polishing a material to be polished.

15 Claims, No Drawings

ABRASIVE MOLDING, ABRASIVE DISC AND POLISHING PROCESS USING THE ABRASIVE DISC

BACKGROUND OF THE INVENTION (1) Field of the Invention

This invention relates to a manganese oxide-based abrasive molding, an abrasive disc provided with the abrasive molding, and a process for polishing a material to be polished by using the abrasive disc.

The abrasive disc of the invention is useful for polishing or chemicomechanically polishing substrate materials such as a silicon wafer, oxide substrate materials, compound semiconductor substrates and glass substrates, and optical materials.

More particularly, the invention relates to an abrasive molding made by molding a powdery manganese oxide raw material, and firing or sintering the molded manganese oxide product; an abrasive disc made by fixing the abrasive manganese oxide molding to a supporting auxiliary; and a process for polishing a material to be polished by using the abrasive disc.

(2) Description of the Related Art

The progress recently made in the optical and electronic industries imposes severe requirements for surface finish of materials such as, for example, magnetic discs, semiconductor substrates and single crystal materials. In processes for polishing substrate materials used in the electronic industry, a loose abrasive polishing process has heretofore been employed wherein substrate materials are polished with a polishing pad made of nonwoven fabric or suede cloth, while a polishing liquid comprising loose grains is continuously applied onto the substrate materials. As examples of the loose grains, there can be mentioned alumina, silica, ceria and zirconia. For example, a chemicomechanical polishing process for selectively polishing an insulating film such as a $SiO_2$ film and an electrically conductive layer such as a tungsten layer by using manganese oxide as loose abrasive grains is described in Japanese Unexamined Patent Publication (hereinafter abbreviated to "JP-A") H9-22888 and JP-A H10-72578. In the conventional loose grain polishing process, a polishing liquid containing a large amount of loose grains is used, and thus, a considerable amount of a waste polishing liquid containing loose grains is produced during polishing. Therefore, the efficiency of the polishing process, and equipment for the waste disposal and the environmental pollution with the waste polishing liquid must be considered. The polishing pad such as a polishing cloth tends to be clogged and the polishing performance is deteriorated, and, thus, the polishing pad must be exchanged with considerable frequency and the polishing efficiency is decreased.

Further, the conventional polishing process using a polishing pad has a problem such that the surface of the polishing pad is pliable and therefore the entire surface of the material to be polished is not uniformly abraded, i.e., the corner portions of the material surface are excessively abraded upon polishing.

SUMMARY OF THE INVENTION

In order to solve the foregoing problems, the inventors have made researches to utilize an abrasive manganese oxide molding, made by molding a powdery manganese oxide, for polishing or chemicomechanically polishing substrate materials such as a silicon wafer, oxide substrate materials, compound semiconductor substrates and glass substrates, and optical materials, and found that a specific abrasive manganese oxide molding has the following benefits.

(1) The abrasive manganese oxide molding has a rough surface due to finely divided manganese oxide particles, and manganese oxide particles are brought in direct contact with a substrate material to be polished, and thus, polishing can be effected by using a polishing liquid containing no loose grain. Further, manganese oxide particles fall off from the abrasive molding only to a minimized extent, and the problem of waste disposal can be mitigated.

(2) The abrasive manganese oxide molding has a high tenacity and thus exhibits a good durability. Therefore polishing operation can be continued over a long period without exchange of the abrasive molding.

(3) A surface finish equal to those of the conventional polishing processes can be obtained. At a polishing rate equal to or higher than those of the conventional processes, a surface finish of the same quality can be obtained. Further, decrease of the polishing performance with time is minor.

(4) Even when a polishing liquid comprising a loose abrasive grain is used, a high polishing rate can be employed at an abrasive grain concentration lower than that in the conventional polishing processes.

(5) Where interconnecting minute pores of the abrasive manganese oxide molding are filled with a solid soluble in a polishing liquid, the durability of the abrasive molding and the fitness of the abrasion molding to a supporting auxiliary can be enhanced.

Thus, a primary object of the invention is to provide an abrasive manganese oxide molding, an abrasive disc having the abrasive molding, and a polishing process using the abrasive disc, wherein the abrasive manganese oxide molding is characterized as having the above-mentioned benefits.

In one aspect of the present invention, there is provided an abrasive molding predominantly comprised of manganese oxide, and having a bulk density of 0.4 to 4.0 g/cm$^3$, a BET specific surface area of 0.2 to 250 m$^2$/g and an average particle diameter of 0.005 to 10 μm.

In another aspect of the invention, there is provided an abrasive disc comprising an abrasive molding and a supporting auxiliary, to which the abrasive molding is fixed; said abrasive molding characterized in that it is predominantly comprised of manganese oxide, and having the above-mentioned properties.

In still another aspect of the present invention, there is provided a process for polishing a material to be polished, which comprises rubbing the material to be polished with an abrasive disc while at least one of the abrasive disc and the material to be polished is moved; said abrasive disc comprising an abrasive molding and a supporting auxiliary, to which the abrasive molding is fixed; said abrasive molding being characterized in that it is predominantly comprised of manganese oxide, and having the above-mentioned properties.

DETAILED DESCRIPTION OF THE PREFERRED EMBODIMENTS

The abrasive molding of the invention is predominantly comprised of manganese oxide, and has a bulk density of 0.4 to 4.0 g/cm$^3$ a BET specific surface area of 0.2 to 250 m$^2$/g and an average particle diameter of 0.005 to 10 μm.

By the term "manganese oxide" used herein we mean oxides of manganese usually having an oxidation number of +2 to +4. The oxidation number of manganese in manganese oxide contained in an abrasive molding can be identified, for example, by X-ray diffractometry. The oxidation number of manganese is not particularly limited provided that it is in the range of +2 to +4. According to Powder Diffraction File published by ICDD in 1991, as examples of manganese oxides having an oxidation number of +2 to +4, there can be mentioned $MnO_2Mn_2O_3$, $Mn_3O_4$, $Mn_5O_8$ and others. The oxidation number used herein is that as determined with a precision to an extent as determined by X-ray diffractometry. For example, assuming that manganese of certain manganese oxide is identified as having a chemical formula $MnO_{1.98}$ by an analyzing method other than X-ray diffractometry, for example, an oxidation number of +3.96, but, identified as having an oxidation number of 4 by X-ray diffractometry, then this should be construed to be manganese oxide with an oxidation number falling within the above-specified range in the invention.

By the term "predominantly" used herein, we mean that the abrasive manganese oxide molding comprises at least 90% by weight of manganese based on the weight of the abrasive molding. The content of manganese oxide can be expressed as a manganese oxide content as measured on a powdery manganese oxide material which has been prepared by heat-treating a powdery manganese oxide raw material. The powdery manganese oxide raw material contains moisture, and therefore, the content of manganese oxide in the molding is expressed as the content thereof based on the weight of the powdery manganese oxide material from which moisture has been removed, i.e., the weight of the material comprising manganese oxide, impurities and an ignition loss.

As for the crystal phase of manganese oxide, the manganese oxide may comprise either a single crystal phase comprising one kind of manganese crystal or a mixed crystal phase comprising at least two kinds of manganese oxide.

The bulk density of the abrasive manganese oxide molding is in the range of 0.4 to 4.0 $g/cm^3$, preferably 0.8 to 3.4 $g/cm^3$, and more preferably 1.5 to 3.4 $g/cm^3$. If the bulk density is too small, the abrasive molding has poor durability and poor shape retention, and is abraded to an undesirably great extent during polishing. In contrast, if the bulk density is too large, the polished material has surface defects and the surface has a poor smoothness.

The BET specific surface area of the abrasive manganese oxide molding is in the range of 0.2 to 250 $m^2/g$ and preferably 0.5 to 250 $m^2/g$. If the BET specific surface area of the silica molding is too large, the abrasive molding has poor retention of shape, and is abraded to an undesirably great extent during polishing. In contrast, if the BET surface area is too small, the polished surface tends to be damaged during polishing and the rate of polishing is reduced.

The average particle diameter of the abrasive molding is in the range of 0.005 to 10 $\mu$m and preferably 0.005 to 5 $\mu$m. By the term "average particle diameter" used herein, we mean an average particle diameter of manganese oxide particles on the surface of the abrasive molding. The average particle diameter can be measured by a scanning electron microscope (SEM) as shown in the working examples. The smaller the average particle diameter of the abrasive manganese oxide molding, the better the surface precision of the polished surface. However, an abrasive molding composed of manganese oxide particles with an average particle diameter of smaller than 0.005 $\mu$m and having the desired properties is difficult to prepare. In contrast, if the average particle diameter exceeds 10 $\mu$m, the polished surface tends to be damaged.

The abrasive manganese oxide molding has a multiplicity of interconnecting minute pores which are open to the exterior. Minute pores having a diameter of several nm to several hundred $\mu$m are connected each other to form substantially interconnected pores open to the exterior. Due to the open interconnecting minute pores, the silica molding is porous, and is not easily clogged and exhibits good working efficiency.

The pore diameter distribution of the interconnecting minute pores is not critical, but is preferably such that the integrated pore volume of minute pores having a pore diameter of at least 1 $\mu$m is at least 20% based on the total integrated pore volume of the minute pores in the abrasive manganese oxide molding. More preferably, the pore diameter distribution is such that the integrated pore volume of minute pores having a pore diameter of 10 to 100 $\mu$m is at least 15%, and the integrated pore volume of minute pores having a pore diameter exceeding 100/$\mu$m is not larger than 5%, based on the total integrated pore volume of the minute pores of the abrasive manganese oxide molding.

When the above-mentioned requirements for pore diameter distribution of minute pores are satisfied, clogging of the abrasive molding becomes difficult to occur, a high polishing efficiency can be continued over a long period, and frequency of dressing of the abrasive molding can be reduced. These benefits become more prominent when the integrated pore volume of minute pores having a pore diameter of 10 to 100 $\mu$m is at least 15%, based on the total integrated pore volume of the minute pores in the silica molding. This is because minute pores having a pore diameter of at least 10 $\mu$m but not larger than 100 $\mu$m exhibit a function of minimizing clogging of the abrasive member, but this function is smaller than that of minute pores having a larger pore diameter. When minute pores having a pore diameter exceeding 100 $\mu$m are present in a large amount, the abrasive member tends to have a rough structure and uniform and precise polishing becomes difficult to attain.

The porosity of the interconnecting minute pores, i.e., the ratio of the apparent volume of the interconnecting minute pores to the apparent volume of the abrasive manganese oxide molding is preferably in the range of 30 to 95% by volume based on the total volume of the abrasive molding. The method of determining the porosity is hereinafter described, and, in the case where a soluble solid is made present within the interconnecting minute pores, the porosity used herein means that as measured before the soluble solid is incorporated therein. If the porosity of the interconnecting minute pores is too small, a high polishing efficiency is difficult to continue over a long period, and frequency of dressing of the abrasive molding is apt to be increased. In contrast, if the porosity of the interconnecting minute pores is too large, the abrasive molding becomes poor in durability and retention of shape.

Process for Producing Abrasive Molding

The process for producing the abrasive molding of the invention will now be described.

First, the process for producing the abrasive manganese oxide molding is not particularly limited provided that a manganese oxide molding having the above-specified properties is obtained. For example, the manganese oxide molding is made by molding a manganese oxide powder, and, if desired, the molded product is further fired or sintered. The molding can be carried out by procedures such as, for example, press-molding, injection molding and cast molding procedures. The molding pressure is not particularly limited, but, for example, in the case when press-molding is effected, the molding pressure is preferably at least 5 kg/cm² and more preferably at least 10 kg/cm².

A powdery raw material can be pre-molded, followed by classification using a sieve. The pressure under which the raw material is pre-molded varies depending upon the particular properties of the powder, but is usually in the range of 5 to 1,000 kg/cm².

To improve the moldability of the powdery raw material, it can be made into granules, for example, by a spray drying or rolling method, or an organic binder or wax can be incorporated therein. In the case where an organic binder or wax is incorporated, the powdery raw material is preferably subjected to degreasing before molding. The degreasing procedure is not particularly limited and includes, for example, heating under the air atmosphere, or heating under an inert gas atmosphere such as nitrogen, argon or helium. The pressure of the gaseous atmosphere may be chosen from a broad range spanning from vacuum to a high pressure. Alternatively, to improve the moldability, it is possible that water is incorporated in the powdery raw material, and the molded product is dried before firing or sintering.

The molded product from which a binder and/or another organic substance has been removed is preferably fired or sintered to improve its strength and durability of an abrasive disc made therefrom. The firing and sintering conditions are not particularly limited, and the temperature, time, program and atmosphere therefor can suitably be chosen. Other means may also be employed.

Soluble Solid

A solid soluble in a polishing liquid can be made present within the interconnecting minute pores of the abrasive manganese oxide molding, to enhance the duration of polishing life of the molding and reduce the abrasion of the molding. Further, the soluble solid is dissolved little by little in a polishing liquid applied during polishing, and therefore, clogging of the pores can be avoided. More particularly the benefits brought about by making present the soluble solid are summarized as follows.

(1) A load due to the frictional force applied to the abrasive molding during polishing can be mitigated, and abrasion of the molding can be reduced. Therefore, damage of the molding can be avoided, or, even if the damage occurs, the degree of damage is minor and the frequency of exchange of the molding can be reduced.

(2) The pressure imposed during polishing can be enhanced and made uniform over the entire molding, and therefore, polishing time can be shortened even for a hard material to be polished.

(3) The solid is dissolved in a polishing liquid gradually from the vicinity of open end of each interconnecting minute pore toward the inside thereof. Therefore clogging on the surface of the abrasive molding is avoided and a sharp edge thereof is retained. Further, the duration of life and polishing efficiency thereof are enhanced.

(4) The abrasive manganese oxide molding usually has a three-dimensional network structure comprised of manganese oxide particles. Therefore, even when the entire amount of soluble solid is dissolved out, the abrasive molding exhibits good retention of shape and polishing can be continued over a long period of time.

(5) The abrasive manganese oxide molding is made by molding a powdery manganese oxide, or, by further firing or sintering the thus-molded product. Therefore, the molding has a multiplicity of interconnecting minute pores which are opened on the polishing surface and form a rough polishing surface. When a soluble solid is filled within the open minute pores, the polishing surface becomes smooth as compared with the solid-unfilled rough surface, and thus, the abrasive molding exhibits enhanced fittability to the surface of a material to be polished. Therefore, deviation of the abrasive molding from the right position on the material to be polished does not occur during polishing, and a high polishing efficiency can be attained and damage of the abrasive molding is prevented or minimized.

The soluble solid is selected from inorganic compounds and organic compounds, which are soluble in the particular polishing liquid used and do not exhibit any chemically baneful influence on the abrasive manganese oxide molding. Usually water is used as a polishing liquid, and thus, a water-soluble solid is used. As examples of the soluble solid, there can be mentioned (i) alkali metal hydroxides such as potassium hydroxide, sodium hydroxide and lithium hydroxide, and alkaline earth metal hydroxides such as magnesium hydroxide and calcium hydroxide; (ii) alkali metal salts such as lithium fluoride, sodium chloride and potassium chloride, alkaline earth metal salts, and hydrates thereof; (iii) resins including thermosetting resins, anaerobic setting resins, ultraviolet setting resins and thermoplastic resins, such as epoxy resins, acrylic resins and polyolefin resins, and adhesives including instantaneous adhesives including instantaneous setting type, contact setting type, ultraviolet setting type and anaerobic setting type adhesives, such as rubber adhesives, hot-melt adhesives, elastomer adhesives, emulsion adhesives, thermosetting adhesives and thermoplastic adhesives; (iv) waxes such as water-soluble waxes; and (v) amines such as urea. These soluble solids may be used either alone or as a combination of at least two thereof.

The soluble solids have a function of enhancing the durability of the manganese oxide molding. The soluble solids (i), (ii) and (v) have a function of enhancing the rate of polishing, in addition to the durability of the manganese oxide molding. More specifically, when an alkali metal hydroxide or an alkaline earth metal hydroxide is used as a soluble solid, it is expected to have a benefit of an etchant in the case where, for example, a silicon wafer is polished, and it exhibits good polishing performance even in the case where a polishing liquid containing no alkali, such as distilled water, is used. When an alkali metal salt, an alkaline earth metal salt or hydrates thereof are used as a soluble solid, an alkali or alkaline earth metal ion dissociated therefrom is expected to have a mechanochemical action, and thus, polishing can be effected even when a polishing liquid containing no loose abrasive grains is used. When an amine is used as a soluble solid for polishing silicon wafer, the rate of polishing can be enhanced.

The amount of the soluble solid is preferably such that it occupies at least 10% by weight based on the total volume of the interconnecting minute pores. If the amount of the soluble solid is too small, it would be difficult to attain the benefits of the soluble solid, i.e., the enhancement of durability of the manganese oxide molding and the reduction of abrasion of the molding.

The process by which a soluble solid is charged within the interconnecting minute pores of the manganese oxide molding is not particularly limited. As examples of the process for charging a soluble solid, there can be mentioned a process wherein a vaporizable soluble solid is vaporized at a high temperature and/or under a reduced pressure, the vaporized soluble solid is passed alone or together with an inert gas through the interconnecting minute pores where the vaporized soluble solid is cooled to be thereby deposited within the minute pores; a process wherein the manganese oxide molding is impregnated with a solution or slurry of a soluble solid, and then the solvent is removed to produce a precipitate of the soluble solid; a process wherein the manganese oxide molding is coated with a solution or slurry of a soluble solid, and then the solvent is removed to produce a precipitate of the soluble solid; and a process wherein the manganese oxide molding is placed in contact with a solution or slurry of a soluble solid under a pressure, and then the solvent is removed to produce a precipitate of the soluble solid. The abrasive molding can be placed under a reduced pressure to deaerate the minute pores before charging a soluble solid therein. The solvent used for preparing the solution or slurry, the conditions for vaporization, and the temperature, pressure and time conditions for charging are not particularly limited, and known solvents and conditions may be employed.

Abrasive Disc

An abrasive disc is made by assembling the above-mentioned abrasive molding and a supporting auxiliary. The supporting auxiliary used includes, for example, metal plates and other shaped parts. The material and shape of the supporting auxiliary, and the assembling procedure are not particularly limited. Usually the abrasive molding is fixed to the supporting auxiliary by a procedure such as an adhering procedure using an adhesive, for example, an elastomer adhesive, a thermoplastic adhesive or a thermosetting adhesive, or a procedure of fitting the abrasive molding to a recess formed on the supporting auxiliary. When an adhesive is used for fixing the abrasive member to the supporting auxiliary, a care should preferably be taken so as to use an adhesive causing no crazing or cracking of the abrasive member, such as an elastomer adhesive.

The supporting auxiliary having the abrasive molding fixed thereto is fitted to a polishing apparatus by fitting directly the supporting auxiliary to the polishing apparatus, or fixing the supporting auxiliary to a disc provided in the polishing apparatus by means of adhesion, embedding or screwing. The manner in which the supporting auxiliary is fitted to the polishing apparatus is not particularly limited, and varies depending upon the structure and shape of the supporting auxiliary.

The number of the abrasive molding fixed to the supporting auxiliary is not particularly limited, but preferably at least two abrasive moldings are fixed. At least two different kinds of abrasive moldings can be fixed to a supporting auxiliary.

When polishing is effected by using a disc having a plurality of abrasive moldings fixed to the supporting auxiliary in an arrangement such that a polishing liquid applied is discharged through drainage conduits formed between the adjacent abrasive moldings, and thus, the polishing rate can be increased. Further, the abrasive molding is brought into uniform contact with the entirety of the material to be polished, and uniform polishing can be effectively conducted. When a disc having one abrasive molding fixed to the supporting auxiliary is used, it is preferable that a conduit for draining a polishing liquid is formed on the polishing surface.

The shape of the abrasive molding is not particularly limited and includes, for example, a columnar pellet and a square pillar shaped pellet having a triangular or quadrilateral cross-section. The size of the abrasive molding also is not particularly limited provided that a desired number of the abrasive moldings are capable of being fixed to a supporting auxiliary.

The manner in which the abrasive moldings are arranged in an abrasive disc is not particularly limited. For example, a plurality of abrasive moldings can be combined together, or a plurality of abrasive moldings are embedded in a large-size auxiliary support of a disc form.

The shape of the abrasive disc used is usually such that it has a flat polishing surface similar to the flat surface to be polished of the material, but, various shapes can be employed, which include, for example, flat-square, disc-form, ring-form or cylindrical form.

When a plurality of abrasive moldings are arranged in an abrasive disc, it is preferable that the polishing surfaces of the arranged abrasive moldings form a plane which is in conformity with the configuration of the polished surface of a material to be polished, so that a largest contact area can be obtained between the polishing surfaces of the moldings and the polished surface of the material. For example, when the polished surface is flat or curved, the polishing surfaces of the moldings preferably form a flat plane or a curved plane, respectively. When the polished surface of the material is flat, the polishing surfaces of the moldings should preferably have the same distance from the major plane of the supporting auxiliary.

Polishing Process

In the polishing process of the invention, the above-mentioned abrasive disc having at least one abrasive molding is used. The polishing conditions under which the abrasive disc is used and the polishing liquid are not particularly limited and may be conventional. For example, when a polishing liquid is used, water having an adjusted predetermined pH value and containing no loose grain can be used as the polishing liquid. Alternatively a loose grain-containing water can be used as the polishing liquid.

The polishing is effected by using the abrasive manganese oxide molding having an enhanced duration of life instead of a polishing cloth in the conventional polishing process, and therefore, frequency of exchange of the abrasive molding can be reduced and the polishing efficiency is enhanced. Further, a polishing liquid containing a minor amount of loose abrasive grains, or not containing loose abrasive grains, and therefore, the problem of waste disposal can be mitigated or avoided. When the polishing liquid used is an aqueous liquid, it should preferably be a liquid such that the resulting waste polishing liquid has a light transmission of at least 10% at a wavelength of 600 nm.

As examples of the material to be polished, there can be mentioned substrate materials including semiconductor substrates such as silicon wafer, oxide substrates and glass substrate; silica glass plates; metallic materials; optical materials such as lens; and building materials such as building stones. The abrasive disc of the invention is useful for polishing or chemicomechanically polishing these materials.

The invention will now be described by the following examples that by no means limit the scope of the invention.

Properties of manganese oxide raw materials, abrasive moldings and abrasive discs were evaluated by the following methods.

(1) Composition of Powdery Manganese Oxide

The contents of manganese, manganese oxide, moisture, loss on ignition and iron in powdery manganese oxide are determined as follows.

The content of manganese (% by weight) is determined by an oxidation-reduction titration method. The content of manganese oxide (% by weight) is determined by calculation from the content of manganese. For example, the content of $MnO_2$ is calculated from the formula: $MnO_2$(wt.

%)=[found total Mn amount (wt. %)×molecular weight of $MnO_2$/atomic weight of Mn]×100.

The content of moisture (% by weight) is determined from the difference between the weights as measured before and after the heat-treatment at 110° C. for 2 hours.

The ignition loss (% by weight) is determined on a sample prepared by heating a powdery manganese oxide at 110° C. for 2 hours to remove moisture. The ignition loss is calculated from the difference between the weights as measured before and after the heat-treatment at 1,100° C. Calibration of the measured weight should be made based on the weight change due to the change of crystal phase by the heat-treatment. It was confirmed that ignition loss of the powdery manganese oxide used in the working examples is approximately zero.

The content of iron is determined by atomic-absorption spectroscopy.

(2) Crystal Phase

Crystal phase is determined on a powdery manganese oxide sample and a molding sample.

The crystal phase of powdery manganese oxide is identified by an X-ray powder diffraction method (CuK α ray, 40 kV, 30 mA) using an X-ray diffraction apparatus "MXP-3" supplied by Mac-science Co.

The crystal phase of an abrasive manganese oxide molding is identified by pulverizing the sample into a powder by a mortar, and in the same manner as mentioned above.

(3) BET Specific Surface Area

BET specific surface area ($m^2$/g) is determined on a powdery sample and a molding sample. The powdery sample is tested as it is, and the molding sample is pulverized and the resulting powder is tested. Measurement is made by a BET monadic method using a testing apparatus "MONOSORB" supplied by Quantachrome Co., U.S.A.

(4) Average Particle Diameter

The average particle diameter ($\mu$m) of powdery manganese oxide is measured on liquid module by using "Coulter LS-130" supplied by Coulter Electronics Co. and the measured values are based on the volume.

The average particle diameter of an abrasive manganese oxide molding is measured by flattening a part of sample molding, and observing only manganese oxide particles on the flattened surface by a scanning electron microscope "ISI DS-130" supplied by Akashi Seisakusho K.K. The thus-measured average particle diameter ($\mu$m) is calculated by an interceptive method.

(5) Bulk Density of Molding

A sample of abrasive molding with a plate-form having a size of 100 mm×100 mm×15 mm (thickness) is prepared. The sample weight is measured by an electronic force balance and the dimensions are measured by a micrometer. The bulk density (g/$cm^3$) is calculated from the weight and dimensions of sample.

(6) Pore Diameter Distribution of Molding

Porosity of a manganese oxide molding is measured by a method using a mercury porosimeter ("Poresizer 9320" supplied by Shimadzu Corp.) while mercury is penetrated therein at a pressure of varying from 0 to 270 MPa. That is, mercury is forced to penetrate into pores in the manganese oxide molding under the specified pressure, and the pore diameter distribution is determined by calculation of the minimum pore diameter into which mercury is penetrated at a stated pressure and the total volume of pores with a diameter of equal to and larger than the minimum pore diameter, from the integrated volume of penetrated mercury and the applied pressure according to the Washburn formula. Usually the calculated pore diameter and the integrated pore volume are calibrated depending upon the surface tension of mercury, the contact angle and the measuring apparatus.

(7) Porosity of Molding

A columnar sample having a diameter of 25 mm and a thickness of 10 mm is prepared. The sample is immersed in a water bath and the water is boiled whereby the sample is impregnated with water. The sample is allowed to stand until the temperature reaches room temperature. Then the sample is taken out and water on the outer surface is wiped off. The pore volume $V_p$ is determined from the increase in weight of the sample saturated with water. The porosity (%) of manganese oxide molding is calculated from $V_p$ and the volume $V_a$ of sample by the following equation: Porosity (%)=($V_p$/$V_a$)×100.

(8) Surface State of Polished Surface

A columnar manganese oxide molding with a diameter of 25 mm and a thickness of 5 mm is prepared. 120 pieces of the columnar sample are fitted to a rotational lower disc having a diameter of 300 mm of a polishing apparatus "PLANOPOL/PEDEMAX 2" supplied by Struers Co. in a manner such that the polishing surfaces of samples form a flat surface. A sample substrate is fitted to an upper disc of the apparatus and polished by the manganese oxide molding-fitted disc at a lower disc revolution of 150 rpm, an upper disc revolution of 150 rpm, a pressure (applied by the aluminum substrate to the lower disc) of 250 g/$cm^2$. During polishing, a distilled water (temperature: 30° C.) as a polishing liquid is dropped at a rate of 500 ml/min onto the polishing surface. The sample substrate is as follows.

In Examples 1 to 5 and Comparative Examples 1, 2 and 5, an aluminum substrate having a diameter of 40 mm.

In Examples 6 and 7, and Comparative Examples 4 and 5, copper substrate having a diameter of 40 mm.

In Example 8 and Comparative Example 7, a square silica glass substrate having a size of 40 mm×40 mm.

The surface state of the polished surface is observed by an optical microscope "BH-2" supplied Olympus Optical Co. The results are expressed by the following two ratings.

Rating A: the polished surface is very smooth and there is no scratch.

Rating B: the surface is not smooth and cannot be uniformly abraded.

(9) Rate of Polishing

The thickness of a sample substrate is measured on ten points on the sample before and after the polishing test by a dial gauge. The rate of polishing ($\mu$m/min) is calculated from the measured thicknesses, and is expressed as the average of ten values.

(10) Durability of Molding

Polishing is continued by using an abrasive manganese oxide molding. At every one hour, the presence of cracks, crazes and other surface defects on the polishing surfaces of abrasive members is observed by the naked eye. The durability of the abrasive molding manganese oxide molding is expressed by the period from the commencement of polishing to the occurrence of surface defects.

Production of Abrasive Molding and Evaluation Thereof

EXAMPLE 1

A powdery raw material of manganese oxide ($Mn_3O_4$) having the characteristics shown in Table 1 was press-molded under a pressure of 50 kg/$cm^2$ and the molded product was fired at a temperature of 950° C. to give a manganese oxide molding. The properties of the manganese oxide molding were evaluated. The results are shown in Table 2.

EXAMPLE 2

The same powdery raw material of manganese oxide ($Mn_3O_4$) as used in Example 1 was press-molded under a pressure of 50 kg/cm² and the molded product was fired at a temperature of 700° C. to give a manganese oxide molding. The properties of the manganese oxide molding were evaluated. The results are shown in Table 2.

EXAMPLE 3

To a powdery raw material of manganese oxide ($Mn_3O_4$) having the characteristics shown in Table 1, polyvinyl alcohol as a binder, stearic acid as a lubricant and water were incorporated to prepare a slurry. The ratio of the powdery manganese oxide to the sum of the binder and the lubricant was 100/30 by volume, the ratio of the binder to the lubricant was 99/1 by volume, and the ratio of the powdery manganese oxide to the water was 100/30 by volume. The slurry was dried by using a spray dryer to give granules. The granules were press-molded under a pressure of 3,000 kg/cm², and the molded product was degreased and then fired at a temperature of 950° C. to give a manganese oxide molding. The properties of the manganese oxide molding were evaluated. The results are shown in Table 2.

EXAMPLE 4

A powdery raw material of manganese oxide ($MnO_2$) having the characteristics shown in Table 1 was press-molded under a pressure of 1,000 kg/cm² and the molded product was fired at a temperature of 950° C. to give a manganese oxide molding. The properties of the manganese oxide molding were evaluated. The results are shown in Table 2.

EXAMPLE 5

The same powdery raw material of manganese oxide ($MnO_2$) as used in Example 4 was press-molded under a pressure of 500 kg/cm² and the molded product was fired at a temperature of 700° C. to give a manganese oxide molding. The properties of the manganese oxide molding were evaluated. The results are shown in Table 2.

EXAMPLE 6

The same powdery raw material of manganese oxide ($Mn_3O_4$) as used in Example 1 was press-molded under a pressure of 1,000 kg/cm² and the molded product was fired at a temperature of 1,100° C. to give a manganese oxide molding. The properties of the manganese oxide molding were evaluated. The results are shown in Table 2.

EXAMPLE 7

To the same powdery raw material of manganese oxide ($Mn_3O_4$) as used in Example 6, 30% by volume, based on the volume of the powdery manganese oxide, of starch was added. The resultant mixture was press-molded under a pressure of 1,000 kg/cm² and the molded product was fired at a temperature of 1,100° C. to give a manganese oxide molding. The properties of the manganese oxide molding were evaluated. The results are shown in Table 2.

COMPARATIVE EXAMPLE 1

The same powdery raw material of manganese oxide ($Mn_3O_4$) as used in Example 1 was press-molded under a pressure of 50 kg/cm² and the molded product was fired at a temperature of 1,450° C. to give a manganese oxide molding. The properties of the manganese oxide molding were evaluated. The results are shown in Table 2.

COMPARATIVE EXAMPLE 2

The same powdery raw material of manganese oxide ($MnO_2$) as used in Example 4 was press-molded under a pressure of 2,000 kg/cm² and the molded product was fired at a temperature of 1,450° C. to give a manganese oxide molding. The properties of the manganese oxide molding were evaluated. The results are shown in Table 2.

COMPARATIVE EXAMPLE 3

To a powdery silica raw material having the characteristics shown in Table 1, polyvinyl alcohol as a binder, stearic acid as a lubricant and water were incorporated to prepare a slurry. The ratio of the powdery silica to the sum of the binder and the lubricant was 100/30 by volume, the ratio of the binder to the lubricant was 99/1 by volume, and the ratio of the powdery silica to the water was 100/30 by volume. The slurry was dried by using a spray dryer to give granules. The granules were press-molded under a pressure of 50 kg/cm², and the molded product was fired at a temperature of 950° C. to give a silica molding. The properties of the silica molding were evaluated. The results are shown in Table 2.

COMPARATIVE EXAMPLE 4

To the same powdery silica raw material as used in Comparative Example 3, 30% by volume, based on the volume of the powdery silica, of starch was added. The resultant mixture was press-molded under a pressure of 50 kg/cm² and the molded product was fired at a temperature of 950° C. to give a silica molding. The properties of the silica molding were evaluated. The results are shown in Table 2.

TABLE 1

| Composition and Properties of Powdery Raw Material | | | |
|---|---|---|---|
|  | Ex.1–3, 6, 7 Com.Ex.1 | Ex.4, 5 Com.Ex.2 | Com.Ex. 3.4 |
| Manganese Oxide |  |  |  |
| Composition |  |  |  |
| Total Mn content (wt. %) | 71.7 | 61.2 | — |
| Mn oxide content (wt. %) | 99.5 | 99.5 | — |
| Impurities: (wt. %) |  |  |  |
| Water | 0.54 | 1.80 | — |
| Iron | 0.015 | 0.004 | — |
| Properties |  |  |  |
| Crystal phase | $Mn_3O_4$ | $\gamma$-$MnO_2$ | — |
| BET specific surface area (m²/g) | 15.3 | 34.7 | — |
| Average particle diameter (μm) | 3.5 | 4.0 | — |
| Silica |  |  |  |
| Composition |  |  |  |
| Silica content (wt. %) | — | — | 95 |
| Impurities: (wt. %) |  |  |  |
| Water | — | — | 5 |
| Ignition loss | — | — | 3.9 |
| $Al_2O_3$ | — | — | 0.52 |
| $Fe_2O_3$ | — | — | 0.05 |
| $TiO_2$ | — | — | 0.08 |
| CaO | — | — | 0.02 |
| MgO | — | — | 0.01 |
| $Na_2O$ | — | — | 0.43 |

TABLE 2

Properties of Abrasive Molding

| | Example | | | | |
|---|---|---|---|---|---|
| | 1 | 2 | 3 | 4 | 5 |
| Bulk density (g/cm$^3$) | 2.20 | 2.08 | 2.24 | 1.98 | 2.07 |
| BET sp. surface area (m$^2$/g) | 2.06 | 8.35 | 1.31 | 0.80 | 3.74 |
| Av. particle diameter ($\mu$m) | 0.61 | 0.16 | 0.97 | 1.62 | 0.34 |
| Crystal phase | Mn$_2$O$_3$ | Mn$_2$O$_3$ | Mn$_2$O$_3$ | Mn$_3$O$_4$ + Mn$_2$O$_3$ | Mn$_2$O$_3$ |
| Integrated pore volume (%) | | | | | |
| Pores with diameter ≧1 $\mu$m | 28 | 37 | 33 | 42 | 36 |
| Pores with diameter 10–100 $\mu$m | 20 | 22 | 20 | 24 | 22 |
| Pores with diameter >100 $\mu$m | 0.2 | 2 | 3 | 0.8 | 2 |
| Porosity (%) | 67.6 | 77.2 | 79.6 | 70.5 | 82.4 |

| | Example | | Comparative Example | | |
|---|---|---|---|---|---|
| | 6 | 7 | 1 | 2 | 3.4 |
| Bulk density (g/cm$^3$) | 2.88 | 2.25 | 4.49 | 4.16 | 0.62 |
| BET sp. surface area (m$^2$g) | 0.38 | 0.43 | 0.02 | 0.06 | 18 |
| Av. particle diameter ($\mu$m) | 3.31 | 2.91 | 63.59 | 21.2 | 0.15 |
| Crystal phase | Mn$_3$O$_4$ | Mn$_3$O$_4$ | Mn$_3$O$_4$ | Mn$_3$O$_4$ | (Silica) |
| Integrated pore volume (%) | | | | | |
| Pores with diameter ≧1 $\mu$m | 24 | 38 | — | — | 24 |
| Pores with diameter 10–100 $\mu$m | 20 | 26 | — | — | 28 |
| Pores with diameter >100 $\mu$m | 0.2 | 3.4 | — | — | 1.1 |
| Porosity (%) | 38.6 | 52.8 | 0.02 | 2.3 | 77.3 |

Polishing Test (1) [Polishing of Aluminum Substrate]

EXAMPLES 1–5 AND COMPARATIVE EXAMPLES 1 AND 2

Using each of the abrasive manganese oxide moldings prepared in Examples 1 to 5 and Comparative Examples 1 and 2, a test for polishing an aluminum substrate was conducted as follows.

A columnar abrasive manganese oxide molding with a diameter of 25 mm and a thickness of 5 mm was prepared. 120 pieces of the columnar abrasive molding sample were fitted to a rotational lower disc having a diameter of 300 mm of a polishing apparatus "PLANOPOL/PEDEMAX 2" supplied by Struers Co. in a manner such that the polishing surfaces of molding samples form a flat surface. An aluminum substrate having a diameter of 40 mm was fitted to an upper disc of the apparatus and polished by the manganese oxide molding-fitted disc at a lower disc revolution of 150 rpm, an upper disc revolution of 150 rpm, a pressure (applied by the aluminum substrate to the lower disc) of 250 g/cm$^2$. During polishing, a distilled water (temperature: 30° C.) as a polishing liquid was dropped at a rate of 500 ml/min onto the polishing surface.

Polishing pressure, state of polished surface and durability of the molding are shown in Table 3.

COMPARATIVE EXAMPLE 5

Polishing was conducted by using a polishing pad as follows.

A polishing pad "Politex DG-BB" supplied by Rodel Co. was fixed to a rotational lower disc (diameter: 300 mm) of a polishing apparatus "PLANOPOL/PEDEMAX-2" supplied by Struers Co. An aluminum substrate was fitted to a rotational upper disc of the polishing apparatus. The aluminum substrate was polished by the polishing pad-fixed disc at a lower disc revolution of 150 rpm, an upper disc revolution of 150 rpm and a polishing pressure of 250 g/cm$^2$. During polishing, an aqueous slurry prepared by dissolving a commercially available alumina grain-containing abrasive compound "RODEL-1662" supplied by Rodel Co. in water (RODEL-1662/water=1:1 by volume) (temperature: 30° C., pH=4) as a polishing liquid was dropped at a rate of 500 ml/min onto the polishing surface. The evaluation results are shown in Table 3.

TABLE 3

Polishing of Aluminum Substrate

| | Example | | | | | Comp. Example | | |
|---|---|---|---|---|---|---|---|---|
| | 1 | 2 | 3 | 4 | 5 | 1 | 2 | 5 |
| Abrasive molding *1 | E1 | E2 | E3 | E4 | E5 | CE1 | CE2 | Pad |
| Polishing condition | | | | | | | | |
| Pressure (g/cm$^3$) | 250 | 250 | 250 | 250 | 250 | 250 | 250 | 250 |
| Results | | | | | | | | |
| State of polished surface | A | A | A | A | A | B | B | A |
| Durability (hours) | 90< | 90< | 90< | 90< | 90< | 90< | 90< | 90< |

*1: Example No. (E) and Comparative Example No. (CE), in which abrasive moldings were prepared. Pad = Polishing pad As seen from comparison of Examples 1–5 with Comparative Example 5, the abrasive manganese oxide molding of the invention gives a polishing surface having a surface precision of the same degree as that attained by a conventional process using a polishing pad. Further, as seen from comparison of Examples 1–5 with Comparative Examples 1 and 2, the abrasive molding of the invention having the specific properties gives a polished surface better than those attained by manganese oxide moldings having a large bulk density, a small specific surface area and a large particle diameter.

Polishing Test (2) [Polishing of Copper Substrate]

EXAMPLES 6 AND 7 AND COMPARATIVE EXAMPLES 3 AND 4

Using each of the manganese oxide moldings prepared in Examples 6 to 7 and the silica moldings prepared in Comparative Examples 3 and 4, a test for polishing a copper substrate was conducted by the same procedure as described in the polishing test (1) for an aluminum substrate. The copper substrate used was a copper disc having a diameter of 40 mm.

Polishing pressure, rate of polishing, state of polished surface and durability of the molding are shown in Table 4.

COMPARATIVE EXAMPLE 6

Using a polishing pad, polishing was conducted by the same procedure as described in Comparative Example 5 except that a copper substrate having a diameter of 40 mm was polished instead of the aluminum substrate, and further that distilled water (temperature: 30° C.) was used as a polishing liquid instead of the mixed liquid composed of the alumina grain-containing polishing compound and water. The evaluation results are shown in Table 4.

TABLE 4

Polishing of Copper Substrate

|  | Example | | Comparative Example | | |
|---|---|---|---|---|---|
|  | 6 | 7 | 3 | 4 | 6 |
| Abrasive molding *1 Polishing condition | E6 | E7 | CE3 | CE4 | Pad |
| Pressure (g/cm³) Results | 250 | 250 | 250 | 250 | 250 |
| State of polished surface | A | A | A | A | A |
| Durability (hours) | 90< | 90< | 90< | 90< | 90< |
| Rate of polishing (μm/min) | 0.32 | 0.12 | <0.01 | <0.01 | <0.01 |

*1: Example No. (E) and Comparative Example No. (CE), in which abrasive moldings were prepared. Pad = Polishing pad As seen from comparison of Examples 6 and 7 with Comparative Examples 3, 4 and 6, the abrasive manganese oxide molding of the invention exhibits an enhanced rate of polishing for a copper substrate even when distilled water is used as a polishing liquid (namely, even when a loose grain is not used). In contrast, when an abrasive silica molding or a conventional polishing pad is used, the rate of polishing for a copper substrate is very low.

Polishing Test (3) [Polishing of Glass Substrate]

EXAMPLE 8 AND COMPARATIVE EXAMPLE 7

Using each of the manganese oxide molding prepared in Example 6 and the silica molding prepared in Comparative Example 4, a test for polishing a glass substrate was conducted by the same procedure as described in the polishing test (1) for an aluminum substrate. The glass substrate used was a square silica glass substrate having a size of 40 mm×40 mm.

Polishing pressure, rate of polishing, state of polished surface and durability of the molding are shown in Table 5.

COMPARATIVE EXAMPLE 8

Using a polishing pad, polishing was conducted by the same procedure as described in Comparative Example 6 except that a square silica glass substrate having a size of 40 mm×40 mm was polished instead of the copper substrate. The evaluation results are shown in Table 5.

TABLE 5

Polishing of Glass Substrate

|  | Example | Comp. Example | |
|---|---|---|---|
|  | 8 | 7 | 8 |
| Abrasive molding *1 Polishing condition | E6 | CE4 | Pad |
| Pressure (g/cm³) Results | 250 | 250 | 250 |
| State of polished surface | A | A | A |
| Durability (hours) | 90< | 90< | 90< |
| Rate of polishing (μm/min) | 0.28 | <0.01 | <0.01 |

*1: Example No. (E) and Comparative Example No. (CE), in which abrasive moldings were prepared. Pad = Polishing pad As seen from comparison of Example 8 with Comparative Examples 7 and 8, the abrasive manganese oxide molding of the invention exhibits an enhanced rate of polishing for a glass substrate even when distilled water is used as a polishing liquid. In contrast, when an abrasive silica molding or a conventional polishing pad is used, the rate of polishing for a glass substrate is very low.

Evaluation of Waste Polishing Liquid

EXAMPLE 9

Using the abrasive manganese oxide molding prepared in Example 1, polishing was conducted by the same procedure as described in Example 1 of the polishing test (1). The transparency of the waste polishing liquid was measured by using a spectrophotometer "Ubest-55" supplied by Nippon Bunkou K.K. at a wavelength of 600 nm. The transparency was expressed as a value in % relative to purified water. The evaluation result is shown in Table 6. When the transparency is high, the amount of loose grains in the waste polishing liquid is small. In contrast, when the transparency is low, the amount of loose grains therein is large.

EXAMPLE 10 TO 13

Polishing and evaluation of a waste polishing liquid were carried out by the same procedure as described in Example 9 except that the abrasive manganese oxide moldings prepared in Example 2, Example 3, Example 4 and Example 5 were respectively used in Examples 10 to 13. The evaluation results are shown in Table 6.

COMPARATIVE EXAMPLE 9

The waste polishing liquid obtained in the polishing test of Comparative Example 5 was evaluated by the same procedure as described in Example 9. The evaluation result is shown in Table 6.

TABLE 6

|  | Example | | | | | Co.Ex. |
| --- | --- | --- | --- | --- | --- | --- |
|  | 9 | 10 | 11 | 12 | 13 | 9 |
| Abrasive molding *1 | E1 | E2 | E3 | E4 | E5 | Pad |
| Transparency (%) | 18 | 23 | 24 | 13 | 22 | 1 |

*1: Example No. (E), in which abrasive moldings were prepared. Pad = Polishing pad As seen from comparison of Examples 9–13 with Comparative Example 9, polishing using the abrasive manganese oxide molding of the invention results in a waste polishing liquid having a high transparency as compared with a conventional polishing process using a polishing pad The benefits of the abrasive manganese oxide molding of the invention are summarized as follows.

(1) The abrasive manganese oxide molding has a rough surface due to finely divided manganese oxide particles, and the manganese oxide particles are brought into direct contact with a substrate material to be polished, and thus, polishing can be effected by using a polishing liquid containing no loose grain. Further, the manganese oxide particles fall off from the abrasive molding only to a minimized extent, and the problem of waste disposal can be mitigated. It is desired that a waste polishing liquid has a light transparency of at least 10% at a wavelength of 600 nm. The desired transparency can easily be achieved by the abrasive molding of the invention.

(2) The abrasive manganese oxide molding has a high tenacity and is not easily damaged during polishing, and thus exhibits a good durability. Therefore polishing operation can be continued over a long period without exchange of the abrasive molding. This is in striking contrast to the conventional polishing processes using a polishing pad.

(3) A surface finish equal to those of the conventional polishing processes can be obtained. At a polishing rate equal to or higher than those of the conventional processes, a surface finish of the same quality can be obtained. Further, decrease of the polishing performance with time is minor.

(4) Even when a polishing liquid comprising a loose abrasive grain is used, a high polishing rate can be employed at an abrasive grain concentration lower than that in the conventional polishing processes.

(5) The abrasive molding can be used for the polishing of a broad range of materials to be polished. Simultaneous polishing of at least materials can be effected.

(6) Where interconnecting minute pores of the abrasive molding are filled with a solid soluble in a polishing liquid, the durability of the abrasive molding and the fitness of the abrasion molding to a supporting auxiliary can be enhanced.

What is claimed is:

1. An abrasive molding predominantly comprised of manganese oxide, and having a bulk density of 0.4 to 4.0 g/cm$^3$, a BET specific surface area of 0.2 to 250 m$^2$/g and an average particle diameter of 0.005 to 10 $\mu$m.

2. An abrasive molding according to claim 1, which has a multiplicity of minute pores with a pore diameter distribution such that the integrated pore volume of minute pores having a pore diameter of at least 1 $\mu$m is at least 20% based on the total integrated pore volume of the minute pores of the abrasive molding.

3. An abrasive molding according to claim 2, wherein the integrated pore volume of minute pores having a pore diameter of 10 to 100 $\mu$m is at least 15%, and the integrated pore volume of minute pores having a pore diameter exceeding 100 $\mu$m is not larger than 5%, based on the total integrated pore volume of the minute pores of the abrasive molding.

4. An abrasive molding according to claim 1, which has a multiplicity of minute pores and a porosity of 30 to 95% by volume based on the apparent volume of the abrasive molding.

5. An abrasive molding according to claim 1, which has a multiplicity of interconnecting minute pores which are open to the exterior; said abrasive molding containing a solid within the minute pores, which is soluble in a polishing liquid.

6. An abrasive disc comprising an abrasive molding and a supporting auxiliary, to which the abrasive molding is fixed; said abrasive molding being predominantly comprised of manganese oxide, and having a bulk density of 0.4 to 4.0 g/cm$^3$, a BET specific surface area of 0.2 to 250 m$^2$/g and an average particle diameter of 0.005 to 10 $\mu$m.

7. An abrasive disc according to claim 6, wherein said abrasive molding has a multiplicity of minute pores with a pore diameter distribution such that the integrated pore volume of minute pores having a pore diameter of at least 1 $\mu$m is at least 20% based on the total integrated pore volume of the minute pores of the abrasive molding.

8. An abrasive disc according to claim 7, wherein the pore diameter distribution is such that the integrated pore volume of minute pores having a pore diameter of 10 to 100 $\mu$m is at least 15%, and the integrated pore volume of minute pores having a pore diameter exceeding 100 $\mu$m is not larger than 5%, based on the total integrated pore volume of the minute pores of the abrasive molding.

9. An abrasive disc according to claim 6, wherein said abrasive molding has a multiplicity of minute pores and a porosity of 30 to 95% by volume based on the apparent volume of the abrasive molding.

10. An abrasive disc according to claim 6, wherein said abrasive molding has a multiplicity of interconnecting minute pores which are open to the exterior; said abrasive molding containing a solid within the minute pores, which is soluble in a polishing liquid.

11. A process for polishing a material to be polished, which comprises rubbing the material to be polished with an abrasive disc while at least one of the abrasive disc and the material to be polished is moved; said abrasive disc comprising an abrasive molding and a supporting auxiliary, to which the abrasive molding is fixed; said abrasive molding being predominantly comprised of manganese oxide, and having a bulk density of 0.4 to 4.0 g/cm$^3$, a BET specific surface area of 0.2 to 250 m$^2$/g and an average particle diameter of 0.005 to 10 $\mu$m.

12. A polishing process according to claim 11, wherein the abrasive molding has a multiplicity of minute pores with a pore diameter distribution such that the integrated pore volume of minute pores having a pore diameter of at least 1 m is at least 20% based on the total integrated pore volume of the minute pores of the abrasive molding.

13. A polishing process according to claim 12, wherein the integrated pore volume of minute pores having a pore diameter of 10 to 100 $\mu$m is at least 15%, and the integrated pore volume of minute pores having a pore diameter exceeding 100 μm is not larger than 5%, based on the total integrated pore volume of the minute pores of the abrasive molding.

14. A polishing process according to claim 11, wherein the abrasive molding has a multiplicity of minute pores and a porosity of 30 to 95% by volume based on the apparent volume of the abrasive molding.

15. A polishing process according to claim 11, wherein the abrasive molding has a multiplicity of interconnecting minute pores which are open to the exterior; said abrasive molding containing a solid within the minute pores, which is soluble in a polishing liquid.

* * * * *